United States Patent

[11] 3,626,443

| [72] | Inventor | Jean-Claude Schneider La Chaux-De-Fonds, Switzerland |
|---|---|---|
| [21] | Appl. No. | 72,532 |
| [22] | Filed | Sept. 15, 1970 |
| [45] | Patented | Dec. 7, 1971 |
| [73] | Assignee | Fabrique d'Horlogerie Chs. Tissot et fils S. A. Le Locle, Canton of Neuchatel, Switzerland |
| [32] | Priority | Sept. 26, 1969 |
| [33] | | Switzerland |
| [31] | | 14571/69 |

[54] PIVOTING ARRANGEMENT FOR MOVING PARTS OF TIMEPIECES
6 Claims, 1 Drawing Fig.

[52] U.S. Cl................................................... 58/140 R, 308/139
[51] Int. Cl....................................................G04b 13/02, G04b 31/00
[50] Field of Search............................................. 58/140 R, 140 A; 308/18

[56] References Cited
UNITED STATES PATENTS
3,324,646  6/1967  Schneider.....................  58/140

Primary Examiner—Richard B. Wilkinson
Assistant Examiner—Stanley A. Wal
Attorney—Stevens, Davis, Miller & Mosher ABSTRACT: A bearing for rotating or oscillating parts of timepieces. A supporting shaft is fixed in the plate and the moving part rotates about it. Axial play of the moving part is limited in one direction by coaction between an inwardly extending flange of the moving part and a wide portion of the shaft and in the other direction by coaction between said flange and the plate or something fixed to it.

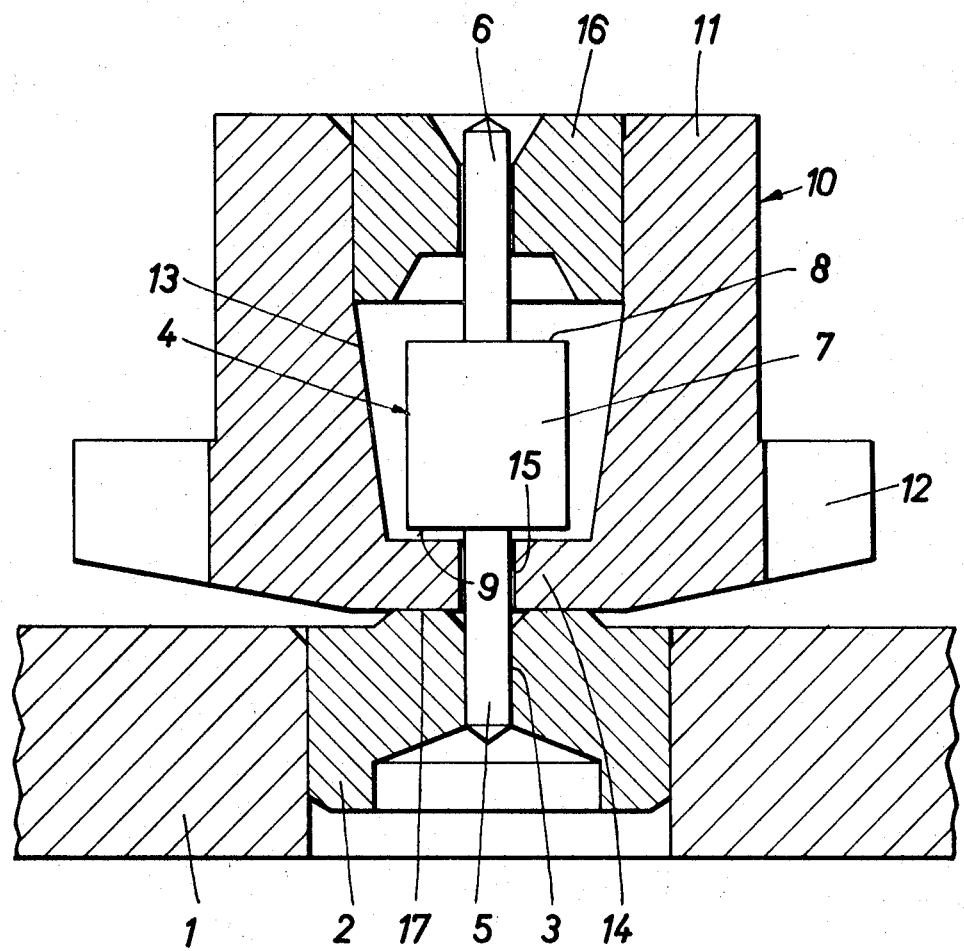

PIVOTING ARRANGEMENT FOR MOVING PARTS OF TIMEPIECES

This invention relates to pivotal mounting of rotating or oscillating parts of watches.

In the past the usual arrangements for pivoting the moving parts of a watch movement comprised a fixed part consisting of two fixed bearings, one in the plate and the other in a bridge and a movable part consisting of an arbor fixed to the moving thing and having at its extremities pivots or journals which engage in the bearings. Thus, the moving part is perfectly guided in rotation and shoulders on the base of the pivots maintain it in place axially with necessary play by butting against the interior faces of the bearings.

There are also known pivot arrangements for moving parts of watch mechanisms in which a turning part comprising one or several bearings in which there engage the bearing portions of a fixed nipple. These arrangements are not such as to insure a bidirectional axial retention so that the turning part is susceptible to disengagement from the fixed nipple. To assure axial bidirectional retention, a bolt or lock can be engaged radially under a shoulder of the fixed nipple, a construction which complicates the construction, renders it larger and difficult to assemble and prevents its use with moving parts of very small dimensions. Furthermore these arrangements do not permit easy exact regulation of axial play during assembly.

The object of the present invention is to provide an extremely free pivot of the moving part of a watch without it being necessary to utilize a bridge fixed with respect to the plate to assure positioning in the axial sense and avoiding at the same time the above-mentioned inconveniences of known arrangements, notably their complication and their high demand for space.

Within this objective, the present invention has as an object to provide a pivot arrangement for moving parts of timepieces which comprises a turning part such as a pinion fixed to a support, said turning part comprising two coaxial bearings spaced from one another, and two stop surfaces acting axially in opposite directions, and a fixed part comprising a shaft fixed to a support at one end only and presenting two bearing surfaces engaged each in one of the bearings of the turning part. The said shaft is characterized in that it includes between the two pivotal support portions an element for axial retention of the turning part. This element of axial retention lies within a space or cavity of the moving part, said cavity being of a diameter greater than that of said element.

The single FIGURE of the annexed drawing shows, entirely by way of nonlimiting example, a view in axial section one form of pivot mechanism constructed in accordance with the present invention.

One sees in the drawing the plate 1 of a watch movement. In a circular opening of this plate or support element 1 there is driven a plug or sleeve 2 which, itself, presents a central opening 3 in which there is force-fit the lower extremity of a bearing shaft 4. The latter which can be, for example, a machined piece, is composed of two elongated shafts 5 and 6 and a central part 7 of a diameter greater than that of the pivots 5 and 6 and having two annular flat shoulders 8 and 9. The shaft 4 supports a mobile part 10 for pivotal movement. In the illustrated form of the invention the mobile part is a pinion but it could also be, in other forms or other modifications of the invention, a gear train comprising a wheel and pinion or any other rotating part of a watch movement. The pinion 10 is made with a central projecting part 11 in the form of a hub which extends above the region of the teeth 12. In this central hub part there is a cavity 13 which extends from the front face of the hub to near the opposite front face. This cavity is limited by a bottom portion or radially inwardly extending flange 14 pierced by a central opening 15, the inner wall of which constitutes one of the bearings of the pinion 10. The external and internal faces of the bottom flange 14 of the pinion are flat and normal to the axis of rotation of the pinion. The pinion carries a second bearing 16 which is in a plug which is driven into the top of the hub portion, said plug being provided with a central hole for the reception of shaft 6. Note that the sleeve portion 16 occupies the upper part of the cavity 13.

As one can see in the drawings, the described elements constitute a pivoting arrangement which can be put in place in a very simple way and which is supported only by the plate 1. During assembly the shaft 4 is first placed in the cavity 13 so that the shaft 5 passes through the opening 15 in the base flange portion 14 of the pinion 10. This opening 15 is adjusted to the diameter of the shaft 5 with the usual radial play. The shaft passes through the opening 15 and sticks out from the pinion 10 when the shoulder 9 of the central part 7 is in contact with the upper surface of the bottom flange 14 of the pinion. Once the support structure comprised of shafts 5 and 6 and intermediate portion 7 is in place in the interior of the cavity 13, the bearing sleeve 16 is driven into the mouth of the cavity in such a way that its opening which is also adjusted for suitable clearance around the pivot shaft 6 is put in the position shown in the drawing. It is then necessary only to put the lower extremity of the shaft 5 in the opening 3 of the sleeve 2 to achieve the mounting of the pinion. The depth of engagement of this shaft in the interior of aperture 3 determines the axial play of the pinion since the latter is retained in place axially on the one hand by the striking of the internal face of the portion 14 against the shoulder 9 of the enlarged portion 7 and in the other direction by the striking of the external face of the same bottom portion 14 against the annular shoulder defined by the circular flange 17 arranged around the opening 3 in the sleeve 2. The different elements of the described arrangement are dimensioned so that the end of the shaft 6 is exactly flush with the sleeve 16 and the upper front face of the pinion 10 when the play is correct. This arrangement facilitates assembly.

Construction according to this invention can be modified in different ways. For example, the shoulder 9 of the wide part of the shaft assembly 4 as well as the surface of the flange 17 which determine the limits of axial play of the pinion can be surfaces convex instead of flat. Furthermore, the attachment of the shaft assembly 4 to the plate 1 instead of being effected by use of the sleeve 2 can just as well be done by providing in the plate 1 a drilled pole corresponding in size and position to the hole 3 and driving the lower extremity 5 of the shaft assembly 4 directly into that hole in the platen.

The herein described arrangement assures that the pinion or other rotatable or oscillating part pivots very freely. It can be effected with a shaft diameters and clearances between bearings which are usual in watch movements of the type in which the support comprises a plate and bridges so that the pivoting is guaranteed under the same conditions. Additionally, since the present invention permits the omission of the bridge, it assures a considerable gain in space in the construction of the caliber. Finally the described arrangement facilitates assembly.

What is claimed is:

1. Pivoting arrangement for moving parts of timepieces comprising a support, a shaft fixed to it at one end only and projecting from it, said shaft having end bearing portions and an intermediate portion, a moving part having spaced bearings and an internal cavity therebetween, said bearings engaging said end bearing portions of said shaft with said intermediate portion accommodated in said cavity, said bearing nearest said support having shoulders on each side thereof one cooperating with the intermediate portion of the shaft to limit axial play in one direction and the other cooperating with the support surface to limit axial play in the other.

2. Pivoting arrangement according to claim 1 in which the surface of the intermediate portion which cooperates with the shoulder on the bearing and the surface of the support which cooperates with the shoulder on the bearing are annular and convex.

3. Pivoting arrangement according to claim 1 in which the surface of the intermediate portion which cooperates with the shoulder on the bearing and the surface of the support which cooperates with the shoulder on the bearing are annular, plane and normal to the axis of the shaft.

4. Pivoting arrangement according to claim 1 in which a sleeve driven in one end of the cavity defines the bearing most remote from the support.

5. Pivoting arrangement according to claim 1 in which the shaft is fixed to the support by being driven into it.

6. Pivoting arrangement according to claim 1 in which said support comprises a plug, said plug being driven into the plate of the timepiece, said plug having a hole therein receiving said one end of said shaft, the surface of said plug constituting the portion of the support that coacts with a shoulder of said bearing to limit axial play.

* * * * *